(12) United States Patent
Eichner et al.

(10) Patent No.: US 9,128,478 B2
(45) Date of Patent: Sep. 8, 2015

(54) METHOD FOR SELECTING A COMMUNICATION SYSTEM ASSIGNED TO A TRANSMISSION NETWORK OF AN AUTOMATION SYSTEM

(75) Inventors: Ingo Eichner, Neustadt/Aisch (DE); Pablo Munoz Ibarra, Erlangen (DE); Friedrich Wedel, Winterthur (CH)

(73) Assignee: Siemens AG, Munich (DE)

( * ) Notice: Subject to any disclaimer, the term of this patent is extended or adjusted under 35 U.S.C. 154(b) by 1305 days.

(21) Appl. No.: 12/719,041

(22) Filed: Mar. 8, 2010

(65) Prior Publication Data

US 2010/0229097 A1    Sep. 9, 2010

(30) Foreign Application Priority Data

Mar. 6, 2009  (DE) .......................... 10 2009 012 164

(51) Int. Cl.
   *G05B 19/05*     (2006.01)
   *G06F 3/00*      (2006.01)

(52) U.S. Cl.
   CPC .. *G05B 19/05* (2013.01); *G06F 3/00* (2013.01)

(58) Field of Classification Search
   CPC ......................................................... G06F 3/00
   USPC ........................................ 715/735, 764, 853
   See application file for complete search history.

(56) References Cited

U.S. PATENT DOCUMENTS

| | | | |
|---|---|---|---|
| 7,062,718 B2 | 6/2006 | Kodosky | |
| 2002/0135610 A1 | 9/2002 | Ootani et al. | |
| 2005/0117610 A1* | 6/2005 | Chevallier et al. | 370/521 |
| 2009/0245138 A1* | 10/2009 | Sapsford et al. | 370/254 |
| 2009/0327901 A1* | 12/2009 | Kapadia et al. | 715/735 |

FOREIGN PATENT DOCUMENTS

| | | |
|---|---|---|
| CN | 1337622 A | 2/2002 |
| CN | 1760841 A | 4/2006 |
| CN | 1965531 A | 5/2007 |

* cited by examiner

*Primary Examiner* — Ajay Bhatia
*Assistant Examiner* — Sherrod Keaton
(74) *Attorney, Agent, or Firm* — Cozen O'Connor

(57) ABSTRACT

A method for selecting a communication system assigned to a transmission network of an automation system, where a transmission network with a plurality of subscribers, connected to the transmission network, of one or more automation systems is displayed, or is capable of being displayed, on a display unit. The transmission network is assigned to a plurality of communication systems, where the plurality of communication systems are each designed or configured for communication over the transmission network between at least two of the subscribers connected to the transmission network. By selecting a selection area assigned to the transmission network on the display unit by a selection device, the plurality of communication systems assigned to the transmission network are displayed on the display unit. Subsequent to selection of the selection area assigned to the transmission network by the selection means, one of the displayed communication systems is then selectable by means of the selection means.

11 Claims, 12 Drawing Sheets

METHOD FOR SELECTING A COMMUNICATION SYSTEM ASSIGNED TO A TRANSMISSION NETWORK OF AN AUTOMATION SYSTEM

BACKGROUND OF THE INVENTION

The present invention relates to a method for selecting a communication system assigned to a transmission network of an automation system, wherein a transmission network with a plurality of subscribers of one or more automation systems connected to a transmission network is displayed, or is displayable, on a display unit, and the transmission network is assigned at least two communication systems, and wherein the at least two communication systems are each designed and configured over the transmission network for communication between at least two of the subscribers connected to the transmission network.

There are known methods for selecting a communication system. For example, a Profibus transmission network with a plurality of subscribers is disclosed in the book "AUTOMATING WITH SIMATIC" (Automating with Simatic, Author: Hans Berger, $3^{rd}$ revised edition 2006, Publicis Corporate Publication), in Chapter 6, Subchapter 6.5. Here, individual subscribers can be connected up to a communication system as a local periphery with a central unit. After selecting the central unit on a screen, property values of this local peripheral system can then be input and changed in a programming system.

A disadvantage of the aforementioned transmission network is that when processing such communication systems the user must have precise information about the significance of the individual subscribers to parameterize a corresponding system.

SUMMARY OF THE INVENTION

It is therefore an object of the present invention to provide a method for processing communication systems assigned to a transmission network, which enables a simple identification and, as required, subsequent processing of individual communication systems.

This and other objects and advantages are achieved in accordance with the invention by a method for selecting a communication system assigned to a transmission network of an automation system, wherein a transmission network with a plurality of subscribers of one or more automation systems connected to the transmission network is displayed on a display unit, at least two communication systems are assigned to the transmission network, where the at least two communication systems are each designed and configured for communication over the transmission network between at least two subscribers connected to the transmission network, by selecting a selection area assigned to the transmission network on the display unit using a selection means, the communication systems assigned to the displayed transmission network are displayed, in particular displayed on the display unit, and in accordance with the aforementioned step of the selection method one of the displayed communication systems can be selected, in particular can be selected by means of the selection means.

In an embodiment of the invention, a method is provided for selecting a communication system assigned to a transmission network of an automation system, wherein a transmission network with a plurality of subscribers connected to the transmission network of one or more automation systems is displayed on a display unit, at least two communication systems are assigned to the transmission network, wherein the at least two communication systems are each designed and configured for communication over the transmission network between at least two subscribers connected to the transmission network and, by a selection system which selects a selection area assigned to a part of the displayed transmission network, all communication systems assigned to the part of the transmission network are displayed, in particular on the display unit and, following the proceeding step of the selection method, one of the displayed communication systems is selectable, in particular by means of the selection means.

Because the selection process for a specific communication system has the graphic display of the transmission network itself as a starting point, it is no longer necessary to know and/or to identify the precise topology, arrangement and/or specific parts of the communication systems (e.g., the central unit) before making the selection. Furthermore, the selection is simplified by the display of the communication systems assigned to the transmission network, because, for example, no advance information on these communication systems is necessary in this case either.

An automation system can, for example, be any kind of electronic and/or electromechanical systems which are suitable and/or designed for controlling and/or regulating a technical system. These can, for example, be systems for controlling, regulating and/or automating machines, devices, production systems or other technical installations.

A transmission network can, for example, be a network designed as a telecommunication network, Internet or a similar network, Ethernet, Industrial Ethernet (IEEE 802.3 and/or 802.3u), PROFINET, an Industrial Ethernet adapted for automation applications, PROFIBUS (IEC 61158/EN50170), AS Interface, KNX (EN50090, ANSI EIA 776), MPI (Multipoint Interface) or similar. Furthermore, a transmission network can also be a corresponding wireless network such as a WLAN, "Industrial WLAN" or mobile radio network.

A communication system within the meaning of the disclosed embodiments of the invention comprises a system having at least two subscribers communicating over the transmission network. The communication can in this case, for example, be temporary, established for a longer period or can also be permanent. A communication system can, for example, be designed as an automation system with a local periphery. Such a system can, for example, have a central unit and, for example, one or more locally arranged field devices and/or locally arranged modules for field devices and/or peripheral systems, with the central unit and the local periphery being connected at least partially or also completely over the transmission network. With respect to the local periphery, for example, one or more of the interface modules assigned to the local periphery can be connected to the transmission network. A communication system of this kind can, for example, be a local peripheral system in accordance with the PROFINET 10 or the PROFIBUS DP standard.

The display unit can, for example, be a display screen, a display (e.g., LCD display) or a similar unit for the graphical display of information. Any electronic unit suitable for and/or designed for the display of graphic information can be used as the display unit.

Examples of a selection means are any symbol or graphic character, or also any graphic, that is or can be displayed on the display unit and can be moved relative to other characters or graphics displayed on the screen (e.g., a graphic display of the transmission network or similar). The operating means by which the relative position of the selection means can be changed, such as manually, can be provided for such movement. Furthermore, additional operating means can also be provided by means of which a concrete selection can then take place by means of the selection means.

Thus, for example, the selection means can comprise a "mouse pointer" which is displayed on the display unit and can be moved relative to the display unit by a mouse connected to the display unit, a joystick or one or more control buttons. Alternatively, the display of the mouse pointer can, for example, also be fixed on the screen surface and, for example, by the control means or another control means, a specific graphic display can be moved on the display unit relative to the mouse pointer. To select a specific part of a display on the display unit, which is to be selected by the display means, for example, a suitable selection button, a button or a mouse button can then be provided for such a selection.

The selection area assigned to the transmission network can, for example, be the graphic display of the transmission network, e.g., including the connected subscribers, or can also be used without the corresponding display of the connected subscribers. The graphic display of the transmission network (e.g., of a corresponding line drawing) can also be provided with a tolerance area provided around the display.

Alternatively or additionally, an alphanumeric display of the transmission network, for example, within a text field or a table, can be used as a selection area.

The display of the communication systems assigned to the transmission network can, for example, occur on the display unit or also on a further display unit. The display can, for example, consist of symbols using alphanumeric characters and/or can also be graphical by using symbols and/or corresponding lines, line shapes, line thicknesses or line structures (dashes, dashes and dots, etc.).

An alphanumeric display can, for example, occur as part of a list or table on the display unit or the further display unit (e.g., as a column or line within such a table or list). A table can, for example, have further columns or lines, which can contain additional information.

Furthermore, the aforementioned display of the assigned communication systems on the display unit can also be graphically assigned to the transmission network or connected thereto, for example, as a connecting line or an arrow between the display of the communication systems and the transmission network.

The selection of the transmission network can, for example, be made by an operator, e.g., by the aforementioned operating means. Furthermore, selection of the transmission network can also be achieved by a control system, which, for example, is controlled by a program.

After the display of the communication systems assigned to the transmission network, if a communication system has been selected, the selected communication system can then be graphically displayed on the display unit. This makes it even easier to understand the structure of the transmission network. The display can, for example, occur in that a corresponding area of the transmission network assigned to the selected communication system is graphically highlighted or marked (e.g., by a change in the thickness of the line and/or color and/or type of line or similar). Furthermore, the selected communication system can also, in parallel or as an alternative, be highlighted within the display of the communication systems assigned to the transmission network (e.g., within a list or table displayed on the display unit), for example also by coloring, type of font, background color and/or corresponding marking in the list display, for example, in a different column of the list.

After a communication system has been selected from the communication systems assigned to the transmission network, the selected communication system is, or can be, assigned an action. Further processing of the data assigned to the communication system is possible through such an action. An action in this case can, for example, be a change in the graphic display of the communication system, an assignment of subscribers, networks, transmission protocols, names or similar and/or also an assignment or change of technical parameters and settings of the communication system or of individual subscribers of the communication system.

Thus, for example, such an action can comprise moving a subscriber or several subscribers of the communication system on the display unit, or also enabling such a movement. Furthermore, an action can also include moving, changing, copying or pasting of subscribers or parts and/or of the complete connecting structure of the communication system. Also, copying, pasting or deleting at least one property value of at least one subscriber of the communication system can be an action or part of an action. Such property values can, for example, include the aforementioned network or transmission parameters or device names, device properties, etc. Furthermore, an action can also include the assignment of at least one of the aforementioned property values to at least one of the subscribers.

Here, the at least one property value can, for example, be one, more or all the property values which are assigned to the named subscribers. The at least one subscriber can also, for example, be one, more or all subscribers of the selected communication system. Property values can, for example, be communication parameters, such as transmission rate, address data, interface information, connected networks and/or devices, transmission protocols used, connection type or similar or also communication system parameters (such as the names or ID identifiers within the system, connected devices, network names, system names, connection pathways, information on establishing and clearing connections or network system manager information).

Furthermore, the method can be configured such that even when a communication system is already selected, actions are also assignable or assigned to the transmission network in accordance with this present description.

The object of the invention is also achieved by a control unit for an automation system, comprising a display unit for displaying a transmission network with a plurality of subscribers of the automation system connected to the transmission network, wherein at least two communication systems are assigned to the transmission network and the at least two communication systems are each designed and configured for communication, over the transmission network, between at least two subscribers connected to the transmission network, operating means for controlling a selection means, displayed on the display unit or a displayed selection means, control equipment which is designed and configured so that by controlling the selection means using the operating means all communication systems assigned to the transmission network are displayed by selecting a selection area assigned to the transmission network on the display unit, and one of the displayed communication systems is then selectable by using the operating means, in particular by the selection means.

Furthermore, the control equipment can also be designed and configured to implement a method in accordance with the disclosed embodiments of the invention.

Also a control unit of this kind has, consistent with the disclosed contemplated embodiments of the method in accordance with the invention, the advantage that the selection of a communication system assigned to a transmission network is simplified, wherein it is particularly possible to perform such a selection without already having more detailed information on the construction and/or structure of the transmission network and/or communication system.

The display unit, the transmission network, the subscribers, the automation system, the display unit, the operating means, the communication systems, the selection means, the selection area and the other features of the control unit can furthermore be designed in accordance with this present description.

Other objects and features of the present invention will become apparent from the following detailed description considered in conjunction with the accompanying drawings. It is to be understood, however, that the drawings are designed solely for purposes of illustration and not as a definition of the limits of the invention. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the following, the invention is explained in greater detail by way of example on the basis of the following drawings, in which.

DETAILED DESCRIPTION OF THE PRESENTLY PREFERRED EMBODIMENTS

Figure 1:
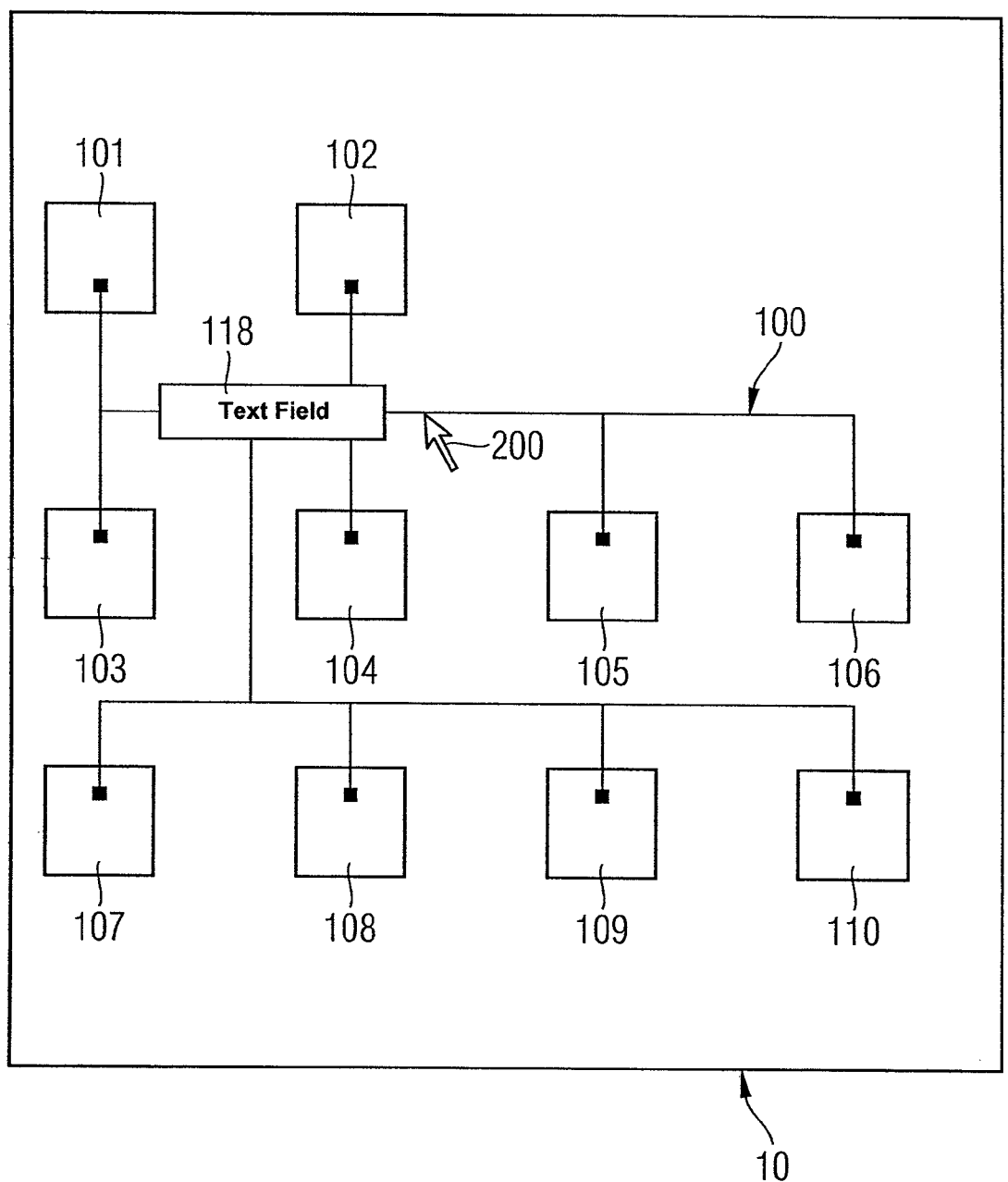
FIG. 1 shows a display of an automation system on a display unit.

FIG. 1 shows a display unit 10 with an automation system, which has a transmission network 100 and subscribers 101-110, displayed on the display 10. In addition to the display of the transmission network 100, a name of the transmission network 100 is shown in a text field 118. Furthermore, a mouse pointer 200, which can be controlled by an operator by using a computer mouse connected to the display unit 10, is shown on the display unit. Here, the mouse pointer is an example of a selection means in accordance with this description, whereas the computer mouse is an example of an operating means according to this description.

In the following description, the transmission network 100 is designated as a complete graph 100.

Figure 2:
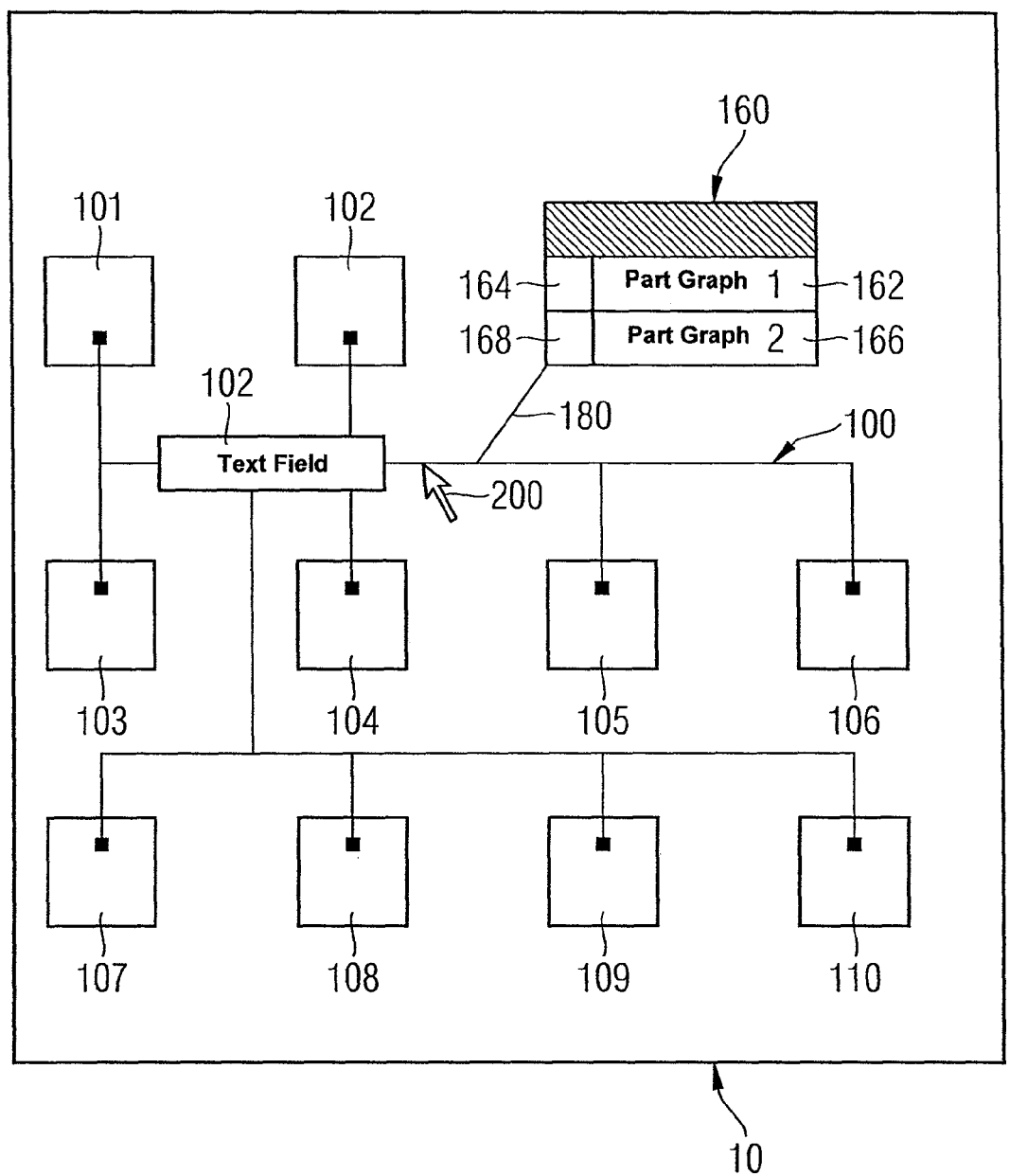
FIG. 2 shows a display of the automation system of FIG. 1, with an assigned communication systems also being displayed.

FIG. 2 shows the display unit 10 of FIG. 1, with the transmission network 100 and the subscribers 101-110, after the mouse pointer 200 has been moved over the line display of the transmission network 100 and this has then been selected by a mouse click. This process of moving and clicking corresponds to an example of the selection by means of the selection means of a selection area assigned to the transmission network 100.

After this selection, a table 160 is shown on the screen 10, which contains the names of the two communication systems assigned to the transmission network 100 in a second, right-hand column consisting of text fields 162 and 166. These two communication systems are designated in this example as part graph 1 and part graph 2. Table 160 also contains, in a first left-hand column, two fixing fields 164, 168 which can be used to show whether or not one of the communication systems is to be permanently displayed on the display unit 10. This is further explained using subsequent drawings.

Furthermore, table 160 is connected by a connecting line 180 to the display of the transmission network 100, so that it is clear to a user that the communication systems part graph 1 and part graph 2, which are listed in the text fields 162 and 166, are assigned to the transmission network 100.

Figure 3:
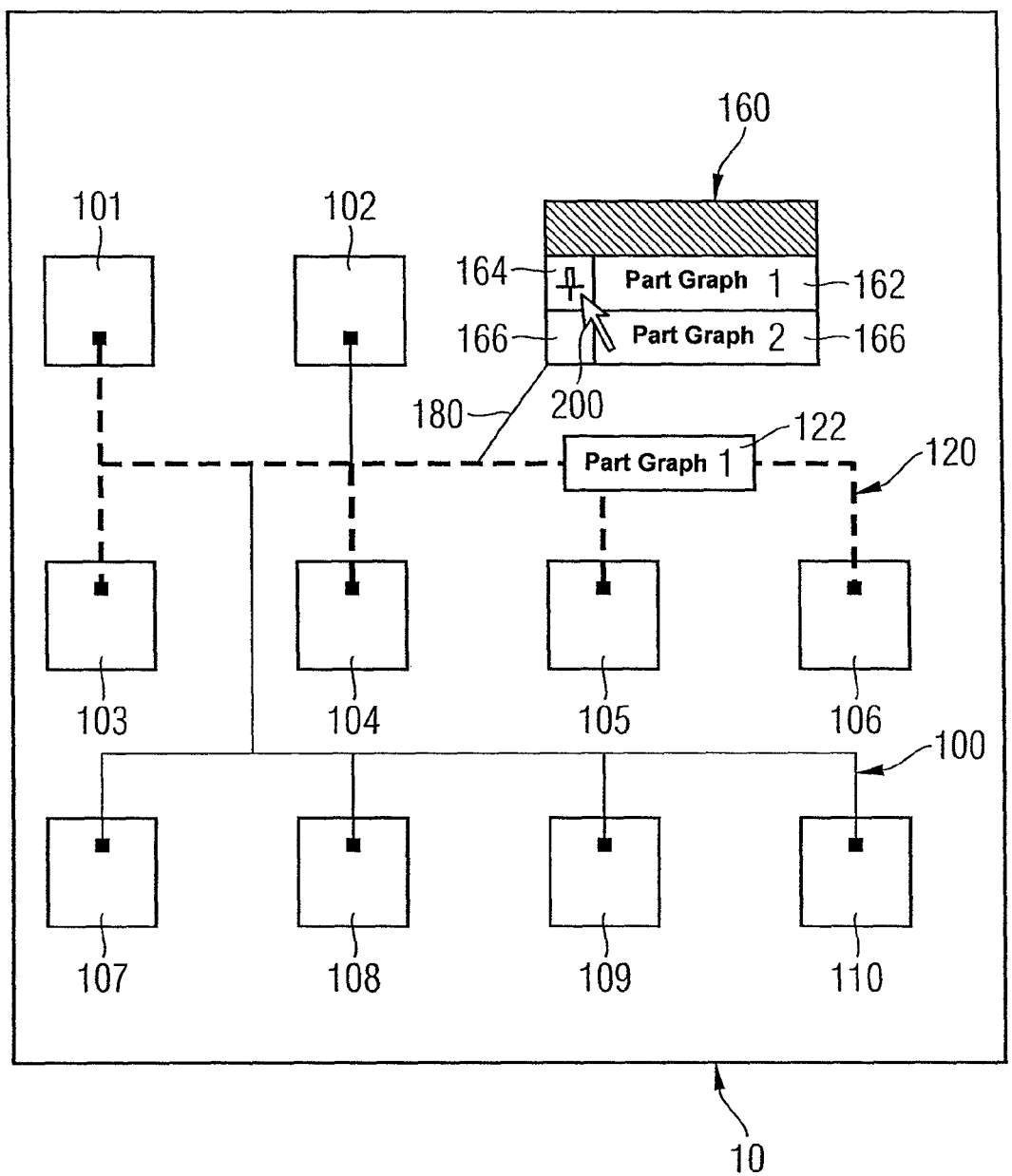
FIG. 3 shows the system of FIG. 2 after selection of a communication system.

FIG. 3 shows the system of FIG. 2, after the communication system "part graph 1" has been selected by moving the mouse pointer 200 over the corresponding field 164 in the table and then by a user clicking with the mouse to select this field and thus "part graph 1" for permanent display. After the selection, this permanent display is indicated symbolically by a pushpin shown in field 164. Parallel to this, a gray background color is furthermore assigned to the text field 162 for part graph 1 to further indicate the selection. Furthermore, the part of the transmission network 100 which is used by the "part graph 1" communication system is shown as a dashed line of increased thickness 120 on the display unit 10. In the present example, it can also be seen that the communication system "part graph 1" includes the subscribers 101 and 103-106, and also the corresponding parts of the transmission network 100 which connect these subscribers.

A communication system of this kind can, for example, be designed as a control unit 101 with field device modules 103-106 comprising a local periphery. Here, the transmission network 100 can, for example, be designed as an "Industrial Ethernet", PROFINET, PROFIBUS or "Industrial WLAN".

To further clarify the display on the display unit 10, a text field 122, on which the name part graph 1 is again displayed, is assigned in the selected transmission part of part graph 1.

The permanent selection of the display of part graph 1 by clicking the front field 164 in the table 160 causes the displayed features, which are assigned to the selected communication system "part graph 1", to remain displayed on the display unit 10 if the mouse pointer 200 is again removed from the table 160.

Figure 4:
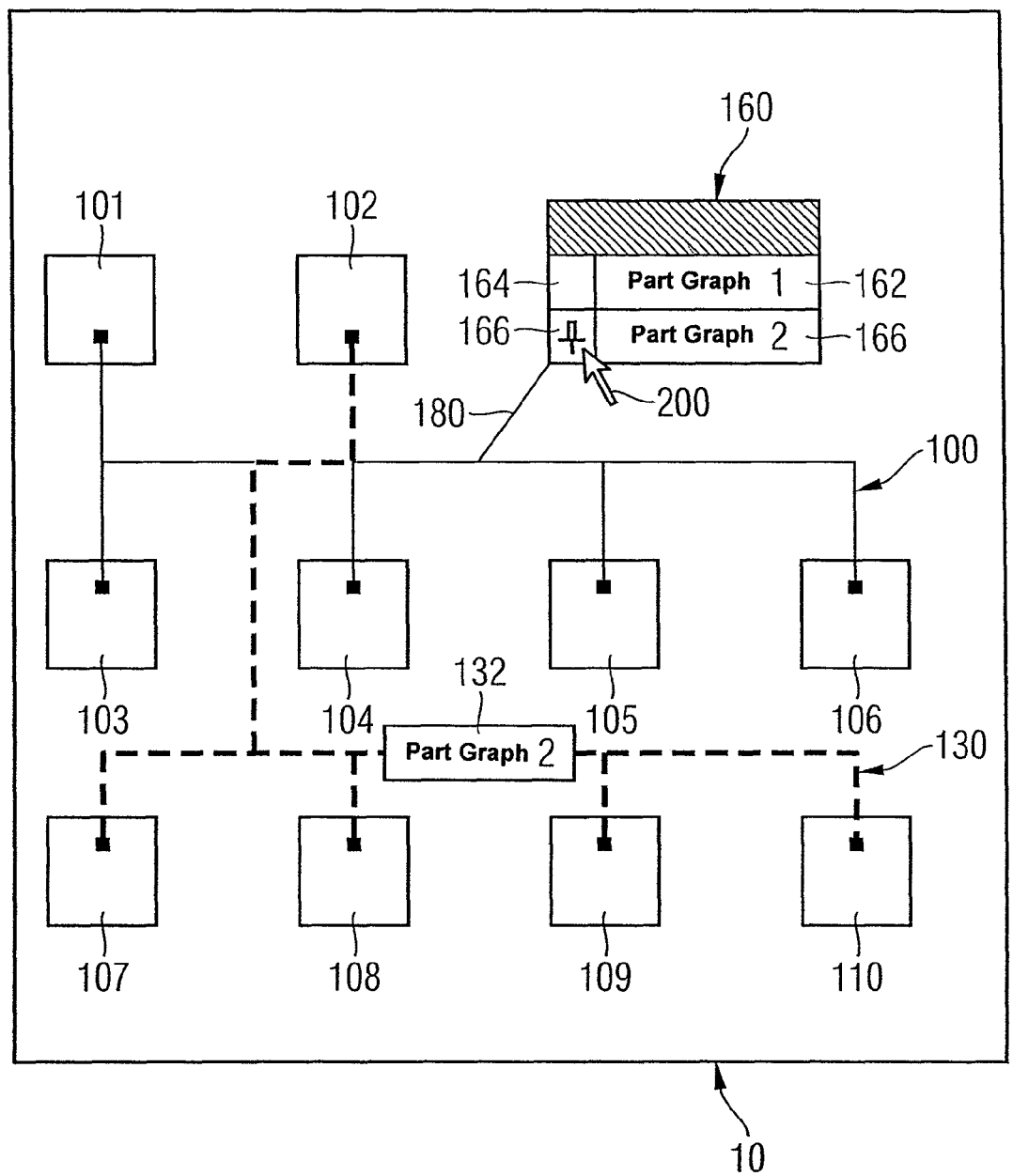
FIG. 4 shows a display of the system of FIG. 3 after selection of a different communication system.

FIG. 4 shows the status displayed in FIG. 3, after the display of part graph 1 was again deselected by the mouse pointer 200 and a second click in the front column of the first line of the table 160 (i.e., field 164 in FIG. 4). After this, a pushpin symbol is no longer shown in this field 164, the gray background of the corresponding name field 162 has disappeared and the parts of the transmission network, shown as a thick dashed line, which are assigned to part graph 1 are likewise no longer visible on the screen 10.

With continued reference to FIG. 4, by clicking on the front field 166 of the second cell, a second communication system with the name part graph 2 was selected instead and fixed on the screen. This is again symbolized by the display of the stylized pushpin symbol in the front field 166 of the second line. Furthermore, the corresponding name field 166 of the name part graph 2 is again provided with a gray background and the corresponding part of the transmission network 100, which is assigned to part graph 2, is shown by a thick dashed line 130 on the screen 10. This part of the transmission network 100, assigned to part graph 2, is again assigned a corresponding name field 132 and shown on the screen. Thus, it can be clearly seen by the user that the part 130 of the transmission network, shown by a thick dashed line, belongs to the communication system "part graph 2".

This second communication system thus includes subscribers 102 and 107-110. A communication system of this kind could, for example, comprise a local control system with a central unit 102 and local field device modules 107-110.

Figure 5:
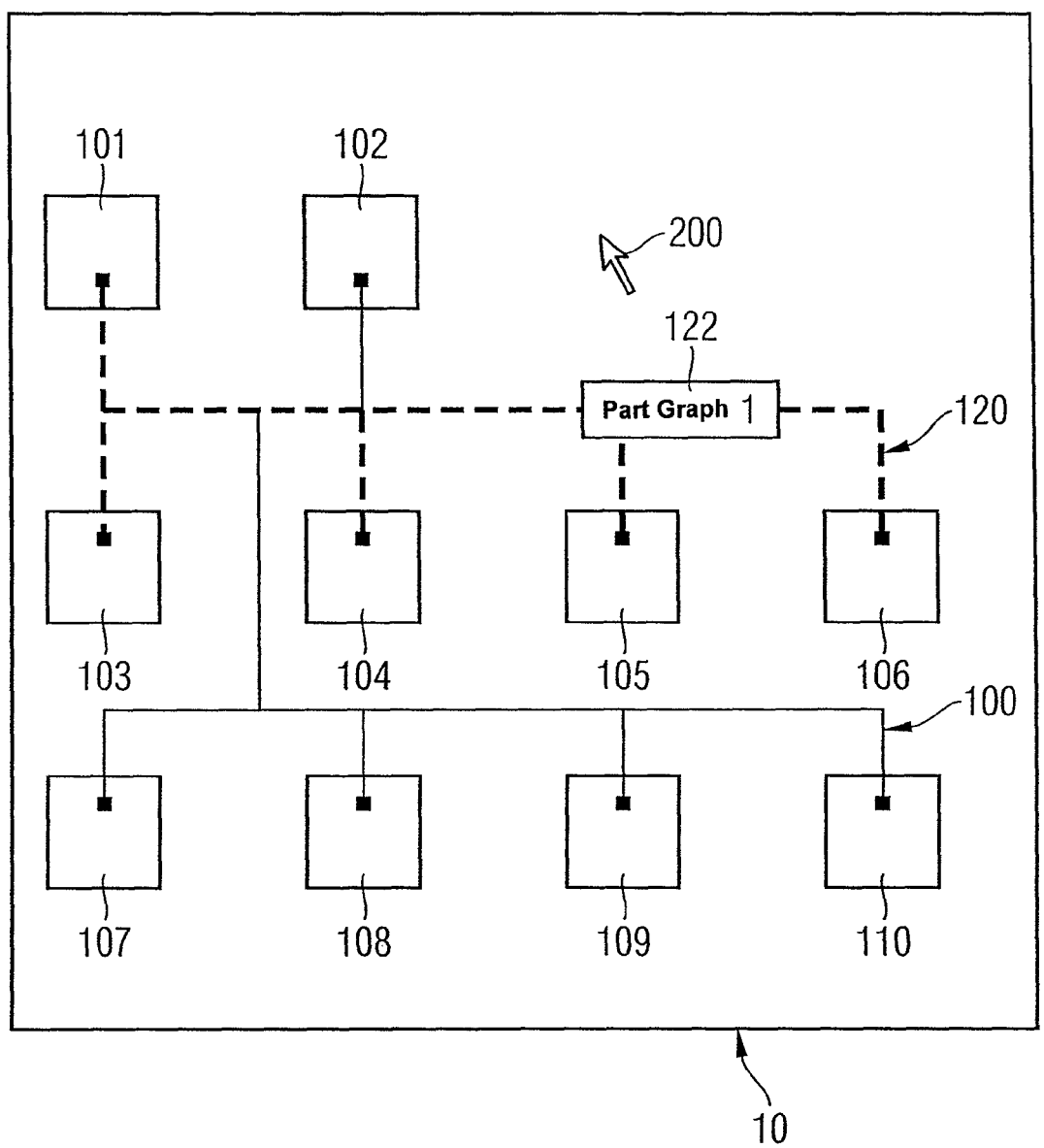
FIG. 5 shows a display of the system of FIG. 3 after hiding a selection list.

FIG. 5 shows the status of the system illustrated in FIG. 3, after the tabular display 160 of the communication systems present in the transmission network 100 has been deselected. This de-selection can, for example, take place in that a user points the mouse pointer to an unoccupied part of the screen 10 and then selects this. The tabular display 160 then disappears, but the permanently selected communication system "part graph 1" remains as a line display 120 and the text block 122 continues to be displayed on the display unit.

Figure 6:
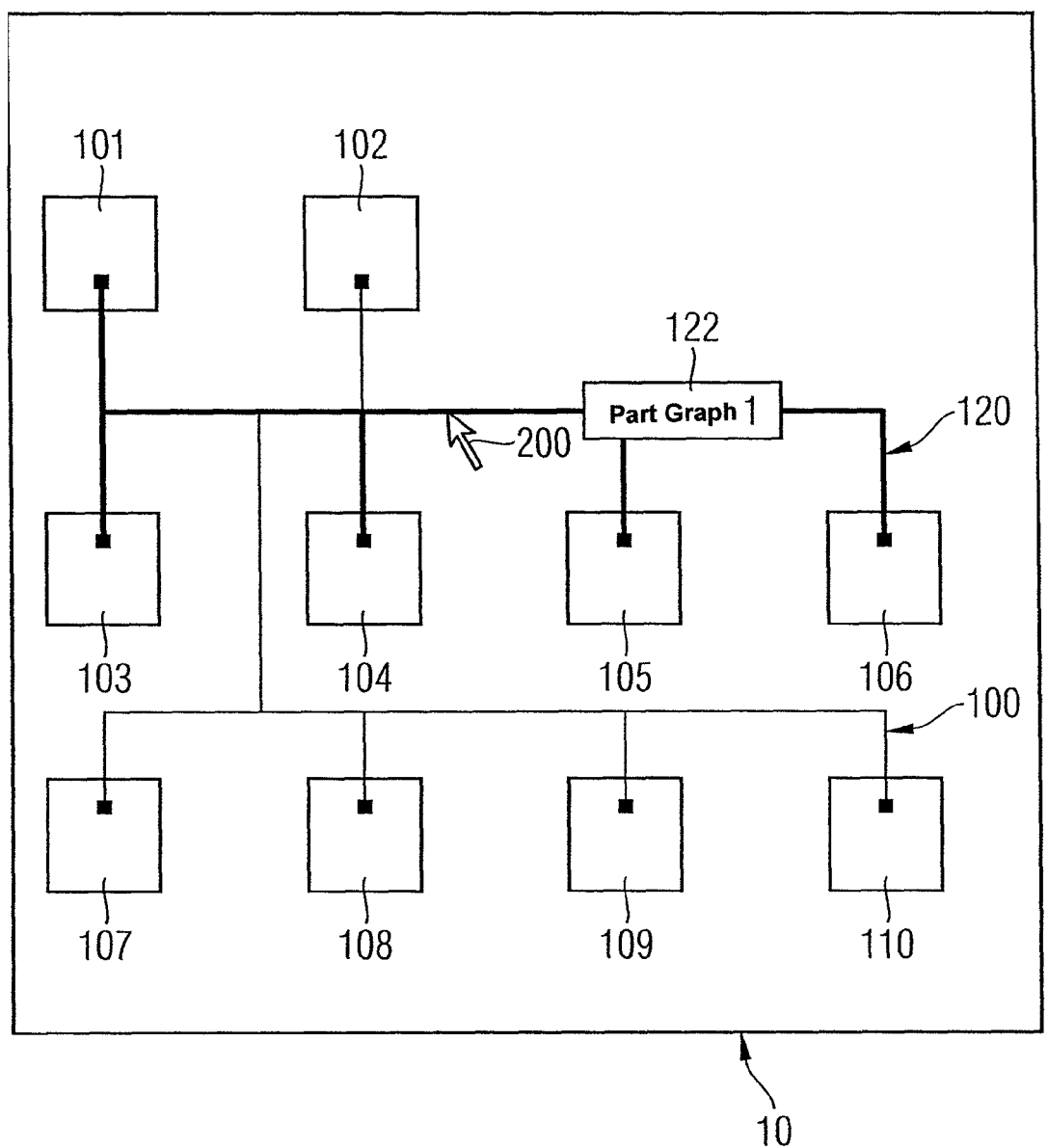
FIG. 6 shows a display of the system of FIG. 5 after selection of the displayed, selected communication system.

FIG. 6 shows the status from FIG. 5 after the display 120 (thick dashed line) of "part graph 1" has been selected using the mouse pointer 200. This selection is then symbolized in FIG. 5 by a thick continuous line 120. After a selection of this kind, a user can then assign actions within the meaning of this description to the communication system. Thus, for example, by suitable inputs (e.g., key inputs and/or mouse clicks) input masks for inputting transmission parameters, subscribers and/or subscriber parameters can be opened and corresponding parameters then input, deleted or changed.

Figure 7:
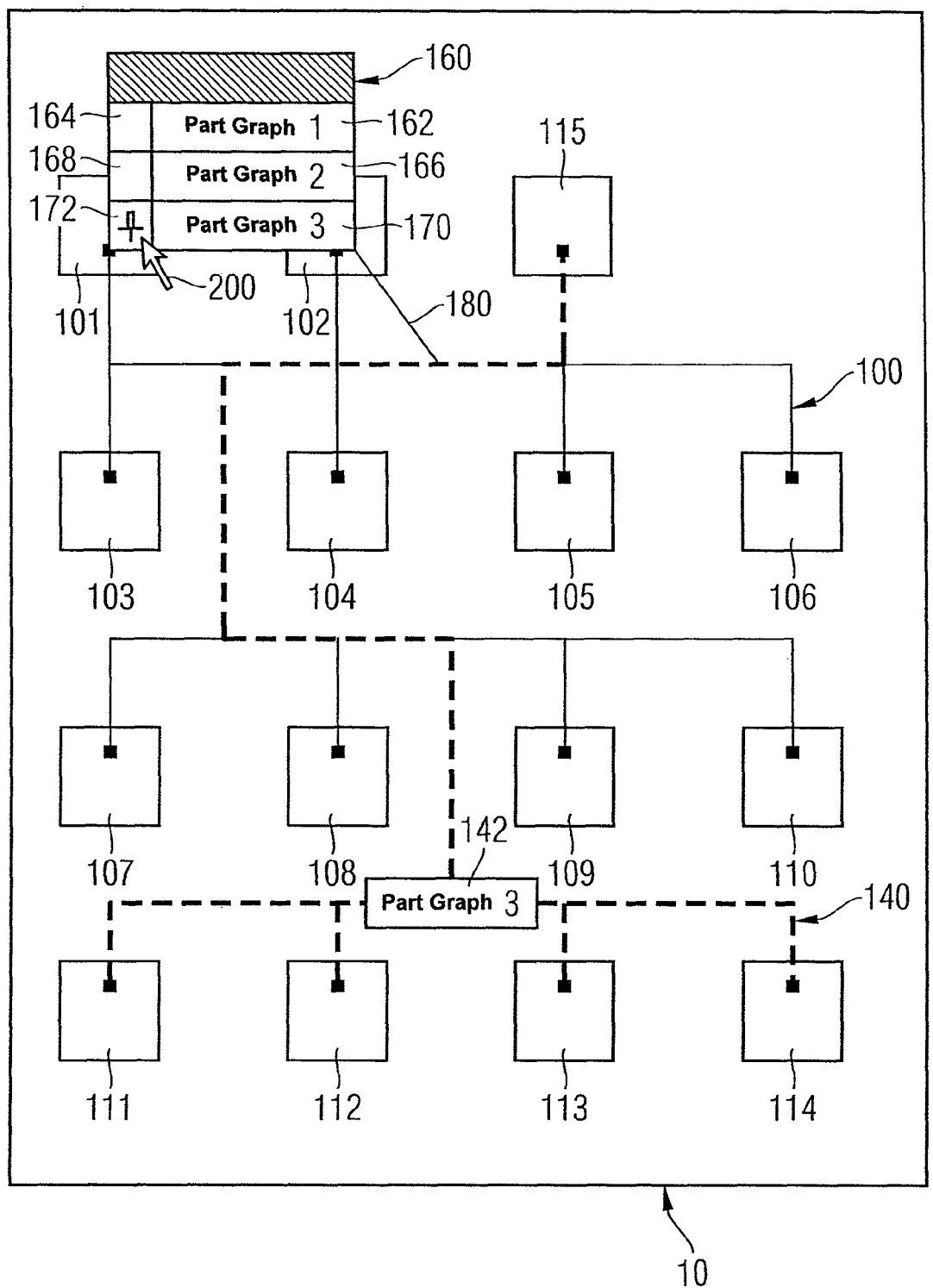
FIG. 7 shows a display of an automation system in accordance with FIG. 1, with an additional expansion and a highlighted third communication system assigned to the expansion.

FIG. 7 shows the system displayed in FIG. 1 after the transmission network 100 has been expanded by five further subscribers 111-115 and corresponding parts of the transmission network 100.

The expanded transmission network 100 is assigned a third communication system "part graph 3". Similarly to the description for FIGS. 1 to 6, table 160 which now shows all three communication systems, was opened by a mouse click on the display 100 of the transmission system. Following this, a graphic display 140 of "part graph 3", a text field 142 with the name "part graph 3" and a gray background of the corresponding table field 170 were/are displayed and fixed on the display 10 by clicking on the front column of the third line of table 160 (text field 172).

Figure 8:
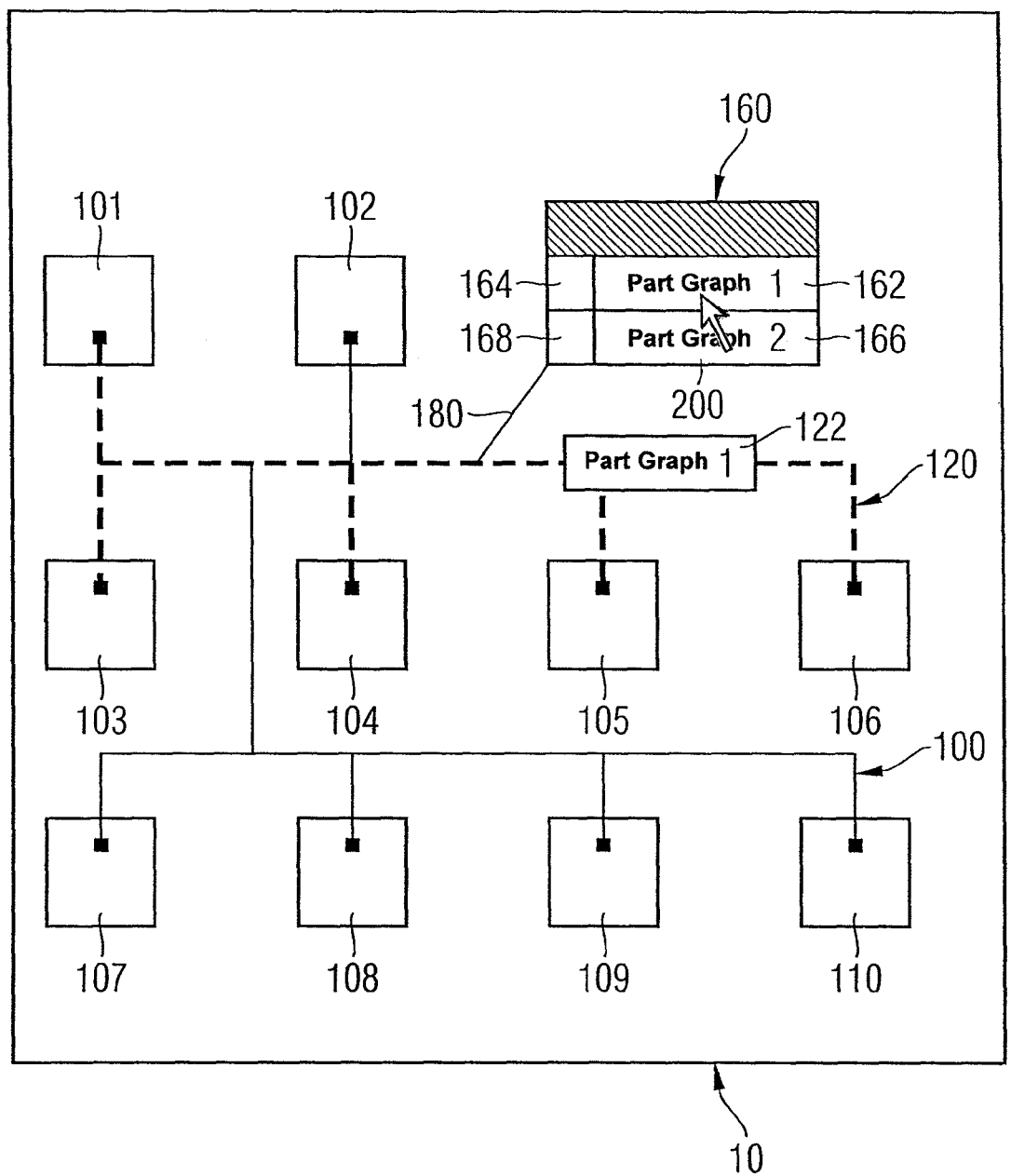
FIG. 8 is an embodiment of the display method of a first communication system in accordance with the invention.

FIG. 8 shows a selection of part graph 1 in the system shown in FIG. 1, without this display being fixed on the screen. This was achieved in that, instead of selecting the front table field 164, the mouse pointer 200 was simply moved over the name field 162 of the table 160 belonging to part graph 1, and the corresponding display of the part graphs 1 as a thick dashed line 120 as well as text field 122 remains on the display unit 10 only for the period during which the mouse pointer 200 is again located over test field 162. Upon immediately removing the mouse pointer from the field, this display disappears.

The communication system "part graph 2" is correspondingly highlighted if the mouse pointer 200 is over the text field 166 assigned to part graph 2.

An advantage of this temporary display of the communication systems is that a user can in this way quickly obtain an overview of the communication systems present, of their appearance and/or of their subscribers.

Figure 9:
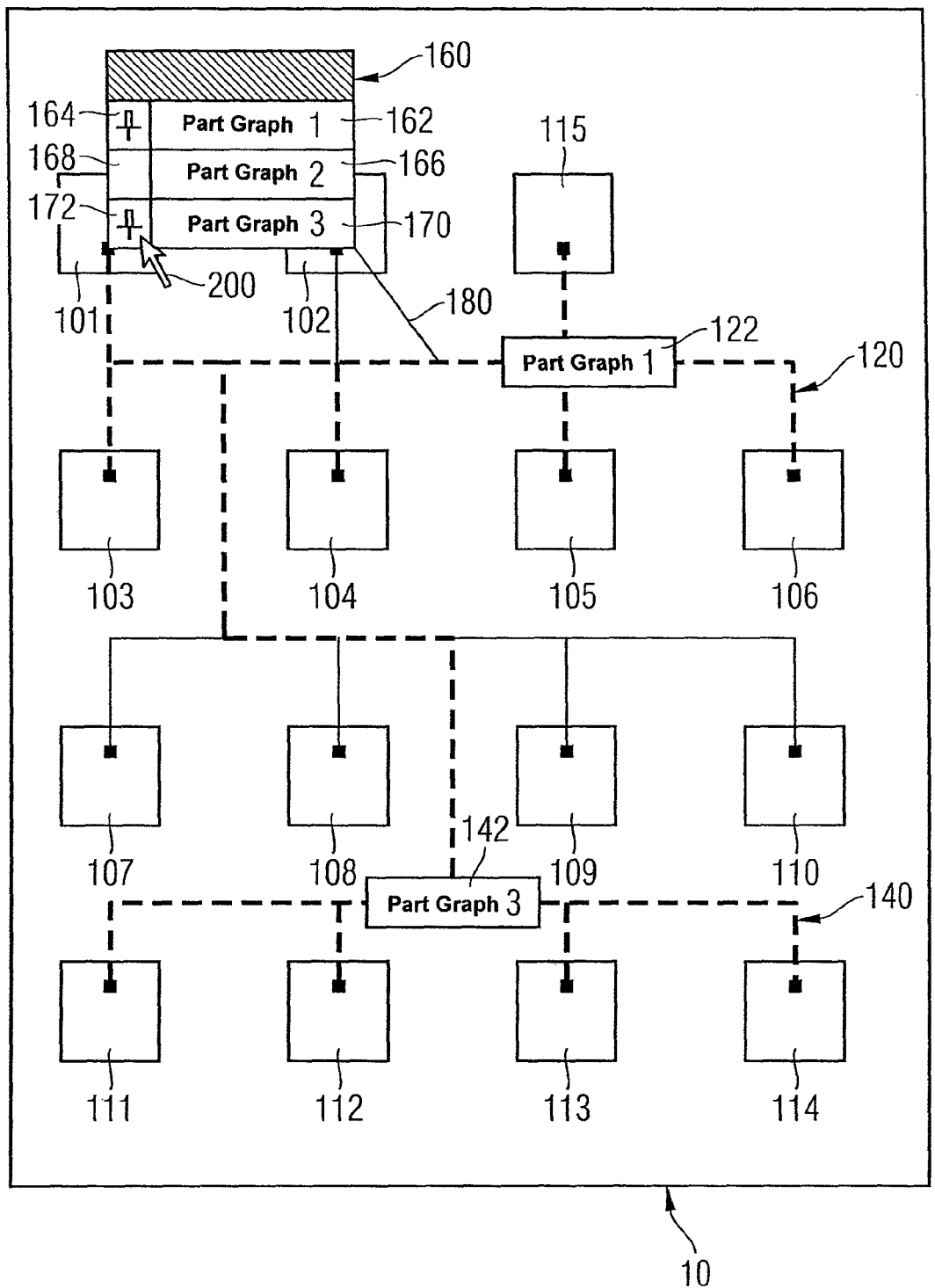
FIG. 9 shows a display of an expanded automation system of FIG. 7 after parallel selection of two communication systems.

FIG. 9 shows the expanded transmission network 100 displayed in FIG. 7, where the graphic displays of both the communication system "part graph 1" and the communication system "part graph 3" are displayed in parallel by correspondingly successively clicking on fields 164 and 172.

Figure 10:
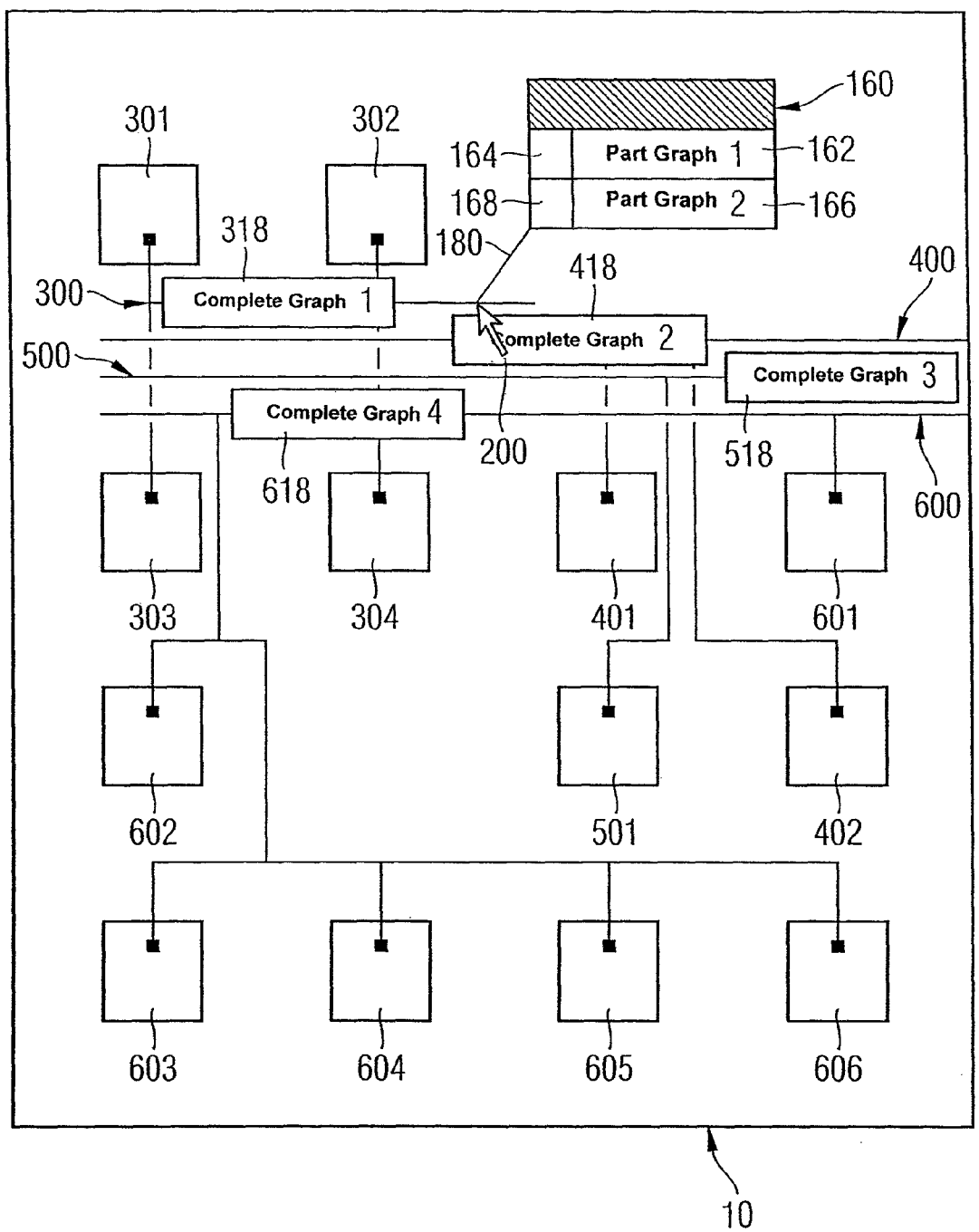
FIG. 10 shows a display of an alternative embodiment of an automation system in accordance with the invention, with a plurality of transmission networks and a communication system assigned to the transmission network.

FIG. 10 shows the display unit 10 with the display of an alternative automation system with a first transmission network 300 with subscribers 301, 302, 303 and 304. The line display 300 of this transmission network is assigned a text field 318, in which its name "complete graph 1" is shown.

Furthermore, the automation system has a second transmission network 400, in which the subscribers 401 and 402 are shown on the display unit 10 in the display in FIG. 10. A text field 418, which includes its name "complete graph 2", is also assigned to the second transmission network 400.

A third transmission network 500, to which only subscriber 501 is assigned on the display unit 10, is shown on the display unit. The name "complete graph 3" is again shown in a corresponding text field 518.

Furthermore, a fourth transmission network 600 with subscribers 601-606 and the text field 618 with the name "complete graph 4" is shown.

With the aid of the mouse pointer 200, the first transmission network 300 was selected and the two communication systems "part graph 1" and "part graph 2" assigned to the "complete graph 1" were displayed in name fields 162 and 166 in table 160. Table 160 is in turn graphically connected by the connecting line 180 with the graphic display 300 of complete graph 1, which makes clear to a viewer of the display 10 to which of the transmission networks displayed the communication systems shown in table 160 belong.

In the following, some aspects of the contemplated embodiment of the present invention are discussed by way of example using the Figures. For this purpose, the term "complete graph" is used for the transmission network and the term "part graph" or "part graphs" is used for the communication systems.

Returning to FIG. 1, the exemplary display unit 10 shows that the starting point for the display of a part graph of the complete graph can be the complete graph itself. For this purpose the user can, for example, move a mouse pointer over any point of the complete graph and remain over it for a specific time or also make a selection.

An advantage here, for example, is that the starting point for the display of the part graphs is the complete graph itself. It is no longer necessary to determine a subscriber to display his assigned part graph or part graphs. The assigned part graphs are, for example, displayed by holding the mouse pointer on any point of the basic complete graph or also by clicking on the basic complete graph with the mouse pointer.

FIG. 2 shows an example of how the displayed selection list can be used to select part graphs for display. This list is automatically displayed immediately upon positioning the mouse pointer over the complete graph or part graphs already displayed or when these are selected by the mouse pointer. The table contains a "Names of existing part graphs" column with cells, each of which contains the name of the part graphs, and a front column "Fixing control elements" for associativity, as to whether the part graph is to be permanently displayed (pushpin display) or only temporarily.

It is an advantage that the display of the assigned part graphs is used to select the part graphs for display. By means of the graphic combination of the part graphs in the table it is possible to switch the part graph to be displayed, significantly faster compared to the previously known method.

Furthermore, the tabular display is visually associated by a line to the associated complete graph. For example, in contrast to what is known as "Tooltips", the user is provided with a visual reference in the form of a line between the displayed table and the context on which it is based. This is particularly useful to the user where there are complex graph systems.

FIG. 3 shows an example of how a part graph is, or can be, selected by a mouse click on a cell of the displayed table. The part graph of the complete graph is displayed by this selection. The assignment of the displayed part graph to the selected table entry is shown by the fixing control element, now displayed (symbol: pin/scriber/pushpin) in the front "Fixing control elements" column and additionally as an option by changing the background color in the "part graph 1" cell.

FIG. 4 shows an example of switching a part graph to be displayed. The user in this case can change the currently displayed part graph at any time by clicking on a different line of the table in the display element. This causes the display of the previously highlighted graph to be ended and the part graph belonging to the line to be displayed.

An example of ending the display of the associated part graphs is shown in FIG. 5. Here, the tabular display is ended when the mouse pointer leaves the rectangle surrounding the table, or the mouse pointer is moved past the rectangle enclosing the table. An advantage in this case is that the table can, for example, be ended without an additional mouse click and the user can immediately interact with the elements of the graphic interface.

FIG. 6 shows an example of an interaction with the displayed and fixed part graphs. The displayed and fixed graph in this case can now be selected and actions such as copying, deleting and displaying of its properties are possible. Apart from this, the complete graph is still also selectable and therefore can also be manipulated. An advantage in this case is that the object defined in the surface model as a part graph can be graphically manipulated independently of the object modeled as a complete graph.

FIG. 7 shows an example of a dynamic expansion by one part graph of the table to show the part graphs. Upon the user immediately expanding the complete graph by further part graphs, they become listed in the table of the display control element. The new part graph can, for example, arise due to new elements (such as edges and/or nodes) of the complete graph, but also, for example, due to new part graphs being defined on the existing complete graph. An advantage of this is that when new part graphs are generated in the complete graph, or if, for example, part graphs are removed, the control elements, within the list of the assigned part graphs, necessary for activating the display, are automatically, i.e., without user intervention, added or removed.

Examples of a non-fixed display of a part graph can be appreciated from FIG. 8. Thus, for example, in a first alternative embodiment, the associated part graph can be displayed by a mouse click on a cell of the "Names of existing part graphs" column as long as the mouse button is pressed ("mouse button down"). The display status is visualized to the user by a change in the background color of the cell. Upon the user releasing the mouse button ("mouse button up"), the display of the part graph is immediately ended.

In a further alternative embodiment, the associated part graph is displayed until the display of the table with the part graphs is again ended, by clicking (first "mouse button down" and then "mouse button up") with the mouse on a cell with the name of a part graph.

The visual fixing of part graphs in the user interface occurs exclusively by clicking with the mouse on a cell of the front column with the "Fixing control elements".

By means of the aforementioned alternative embodiments of the invention, the user can, for example, create a fast overview of the part graphs, if for example he does not intend to interact with the part graphs.

FIG. 9 shows an example of a simultaneous display of several part graphs by multi-selection of table lines in the table of part graphs. Here, the user can simultaneously highlight several part graphs of the complete graph by selecting several table lines. In addition, a further control element can be integrated into the tabular display of the part graphs, by which the user can display all existing part graphs by a mouse click (e.g., function: Show all). These exemplary embodiments have, for example, the advantage that it is possible for the user to display several part graphs simultaneously in order, for example, to delete these part graphs all at once or to visually compare them with each other.

Figure 11:
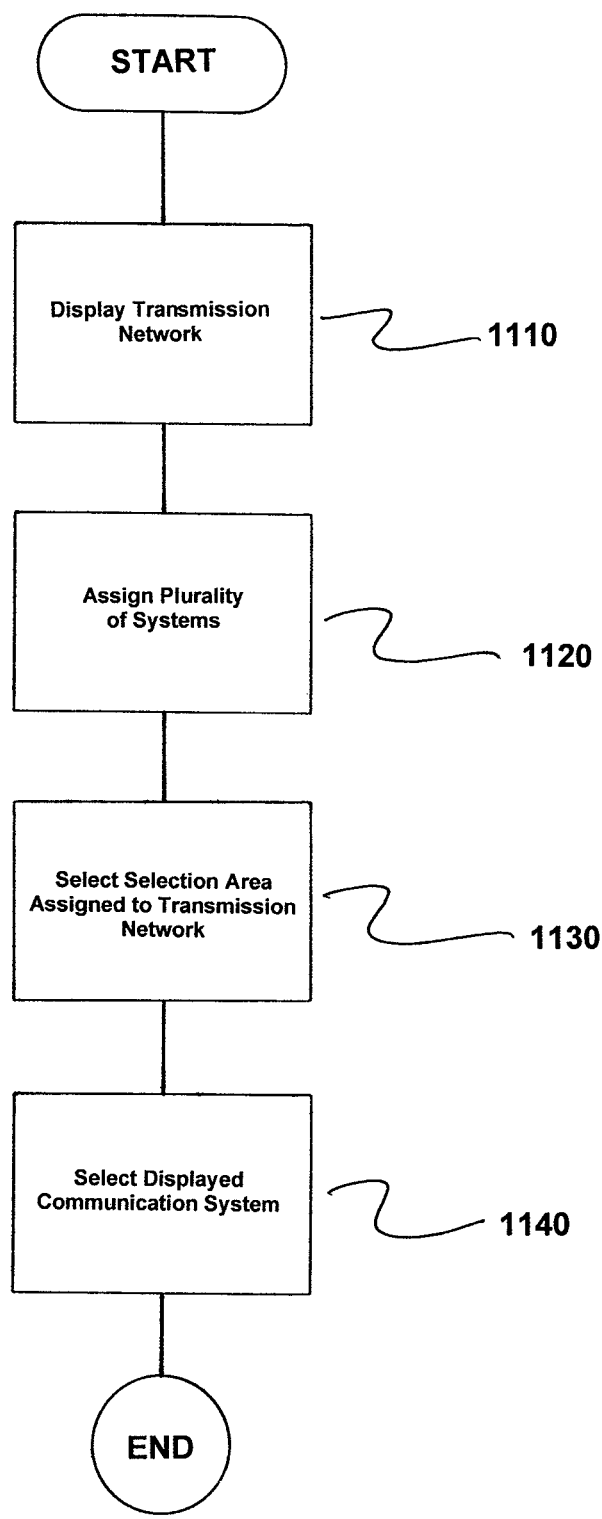
FIG. 11 is a flow chart illustrating a method in accordance with an embodiment of the invention.

FIG. 11 is a flow chart illustrating a method for selecting a communication system (120, 130, 140) assigned to a transmission network (100, 300, 400, 500, 600) of an automation system in accordance with an embodiment of the invention. The method comprises displaying on a display unit (10) a transmission network (100, 300, 400, 500, 600) including a plurality of subscribers (101-115) to at least one automation system, as indicated in step 1110. Here, each of the plurality of the subscribers is connected to the transmission network. Next, a plurality of communication systems (120, 130, 140) is assigned to the transmission network (100, 300, 400, 500, 600), as indicated in step 1120. Here, each of the plurality of communication systems (120, 130, 140) is configured for communication over the transmission network (100, 300, 400, 500, 600) between at least two of said plural subscribers (101-115) connected to the transmission network (100, 300, 400, 500, 600), as indicated in step 1130.

Next, a selection is performed by a selection means (200) of a selection area (100, 300, 400, 500, 600) that is assigned to the transmission network on the display unit to display the communication systems (120, 130, 140) assigned to the transmission network (100, 300, 400, 500, 600). Each of the plurality of communication systems (120, 130, 140) in this case is displayed on the display unit (10). A displayed communication system is then selected using the selection means (200) after the selection area is selected, as indicated in step 1140.

Figure 12:
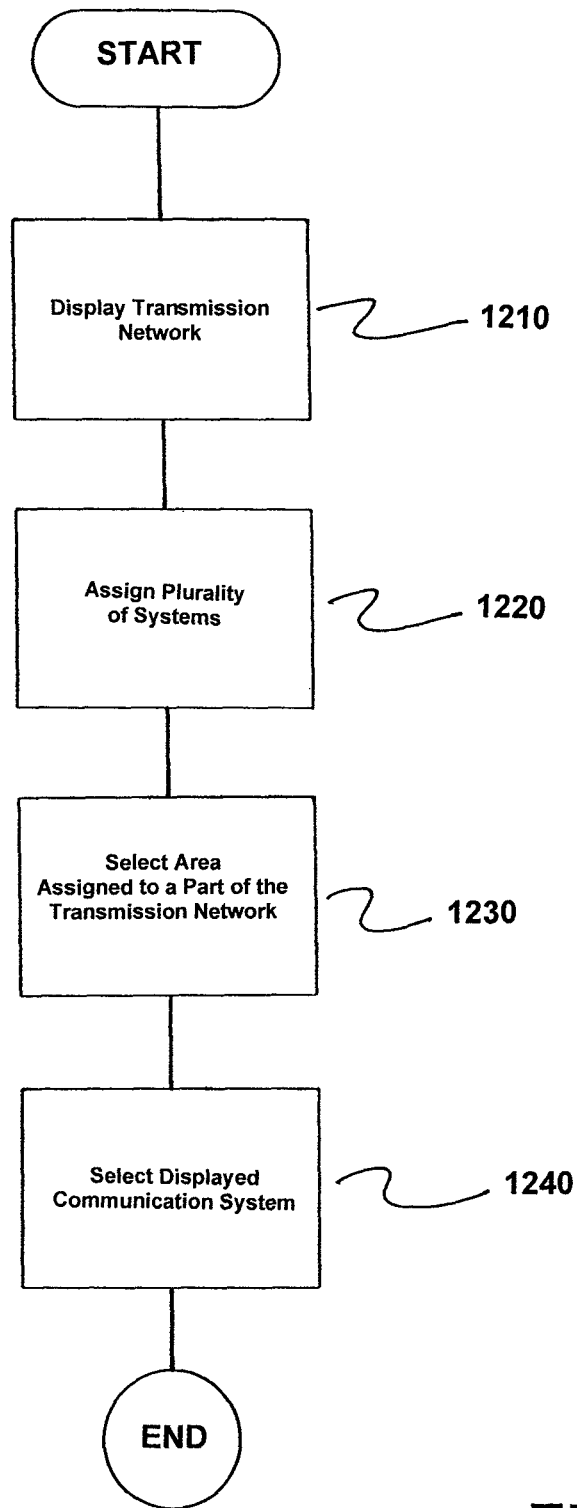
FIG. 12 is a flow chart illustrating a method in accordance with an alternative embodiment of the invention.

FIG. 12 is a flow chart illustrating a method for selecting a communication system (120, 130, 140) assigned to a transmission network (100, 300, 400, 500, 600) of an automation system in accordance with an alternative embodiment of the invention. Here, the method comprises displaying a transmission network (100, 300, 400, 500, 600) including a plurality of subscribers (101-115) to at least one automation system on a display unit (10), as indicated in step 1210. Here, each of the plurality of plural subscribers is connected to the transmission network.

Next, a plurality of communication systems (120, 130, 140) is assigned to the transmission network (100, 300, 400, 500, 600), as indicated in step 1220. Here, each of the plurality of communication systems (120, 130, 140) is configured over the transmission network for communication between at least two of said plural subscribers (101-115) connected to the transmission network.

Next, a selection is performed by a selection means (200) of a selection area (100, 300, 400, 500, 600) that is assigned to a part of the transmission network (100, 300, 400, 500, 600) on the display unit to display the communication systems (120, 130, 140) assigned to the part of the transmission network (100, 300, 400, 500, 600), as indicated in step 1230. Here, the communication systems (120, 130, 140) is displayed on the display unit (10).

A selection of a displayed communication system is then performed using the selection means (200) after the selection area is selected, as indicated in step 1240.

Thus, while there are shown, described and pointed out fundamental novel features of the invention as applied to preferred embodiments thereof, it will be understood that various omissions and substitutions and changes in the form and details of the illustrated apparatus, and in its operation, may be made by those skilled in the art without departing from the spirit of the invention. Moreover, it should be recognized that structures shown and/or described in connection with any disclosed form or embodiment of the invention may be incorporated in any other disclosed or described or suggested form or embodiment as a general matter of design choice.

What is claimed is:

1. A method for selecting a communication system assigned to a transmission network of an automation system, comprising:
   a) displaying on a display a transmission network including a plurality of subscribers to at least one automation system, each of said plural subscribers being connected to the transmission network;
   b) assigning a plurality of communication systems to the transmission network, each of said plural communication systems being configured for communication over the transmission network between at least two of said plural subscribers connected to the transmission network;
   c) selecting, by a graphical character, a selection area assigned to the transmission network on the display to display the plural communication systems assigned to the transmission network, the plural communication systems being displayed on the display and the selected area being graphically connected to the transmission network by a connecting line when displayed in tabular form comprising names of the plural communication systems assigned to the transmission network and fixing fields for determining whether to permanently display one communication system of said plural communication systems assigned to the transmission network; and
   d) selecting one of the displayed communication systems using the graphical character after the selection area is selected; and
   e) graphically displaying and highlighting the selected communication system permanently on the display after selecting the displayed communication system via a fixing field.

2. The method as claimed in claim 1, further comprising: assigning an action to the selected communication system after selecting the displayed communication system using the graphical character.

3. The method as claimed in claim 1, wherein the assigned action is one of assigned or assignable in parallel to the transmission network.

4. The method as claimed in claim 2, wherein at least one of a movement of at least one subscriber of the selected communication system is assignable as an action, copying, pasting or deleting at least one property value of at least one subscriber of the selected communication system is assignable as the action and an assignment of at least one property value to at least one subscriber of the selected communication system is assignable as the action.

5. A method for selecting a communication system assigned to a transmission network of an automation system, comprising:
   a) displaying a transmission network including a plurality of subscribers to at least one automation system on a display, each of said plural subscribers being connected to the transmission network;
   b) assigning a plurality of communication systems to the transmission network, each of said plural communication systems being configured for communication over the transmission network between at least two of said plural subscribers connected to the transmission network;
   c) selecting, by a graphical character, a selection area assigned to a part of the transmission network on the display to display each of said plural communication systems assigned to the part of the transmission network, each communication system of said plural communication systems being displayed on the display, and the selected area being graphically connected to the transmission network by a connecting line when displayed in tabular form comprising names of the plural communication systems assigned to the transmission network and fixing fields for determining whether to permanently display one communication system of said plural communication systems assigned to the transmission network;
   d) selecting one of the displayed communication systems using the graphical character after the selection area is selected; and
   e) graphically displaying and highlighting the selected communication system permanently on the display after selecting the displayed communication system via a fixing field.

6. The method as claimed in claim 5, further comprising: assigning an action to the selected communication system after selecting the displayed communication system using the graphical character.

7. The method as claimed in claim 6, further comprising: assigning as the action at least one of a movement of at least one subscriber of the selected communication system, copying, pasting or deleting at least one property value of at least one subscriber of the selected communication system and assigning at least one property value to at least one subscriber of the selected communication system.

8. The method as claimed in claim 6, wherein the assigned action is one of assigned or assignable in parallel to the transmission network.

9. An automation system, comprising:
   a) an electronic display for displaying a transmission network including a plurality of subscribers of the automation system connected to the transmission network, a plurality of communication systems being assigned to the transmission network, and each of said plural communication systems being configured over the transmission network for communication between at least two subscribers connected to the transmission network;
   b) an operator controlling a graphical character displayed on the electronic display; and
   c) control equipment which, under control of the graphical character by the operator, all of said plural communication systems assigned to the transmission network are displayable by selecting a selection area assigned to the transmission network on the electronic display, and so that one of said displayed plural communication systems is selectable by using the graphical character;

wherein the selected area is graphically connected to the transmission network by a connecting line when displayed in tabular form comprising names of the plural communication systems assigned to the transmission network and fixing fields for determining whether to permanently display one communication system of said plural communication systems assigned to the transmission network; and wherein the selected communication system is graphically displayed and highlighted permanently on the display after selecting the displayed communication system via a fixing field.

10. An automation system as claimed in claim 9, wherein one of said displayed plural communication systems is further selectable by the graphical character.

11. An automation system as claimed in claim 9, wherein the control equipment is further configured to:
 a) display on the electronic display the transmission network including each of said plural subscribers to at least one automation system;
 b) assign each of said plural communication systems to the transmission network;
 c) select, by the graphical character, the selection area assigned to the transmission network on the electronic display to display the communication systems assigned to the transmission network, each of said plural communication systems being displayed on the electronic display; and
 d) select one of the displayed communication systems using the graphical character after the selection area is selected.

* * * * *